Nov. 6, 1962 — L. WEISBACH — 3,061,880
MOLDING TOY
Filed Dec. 7, 1959 — 3 Sheets-Sheet 1
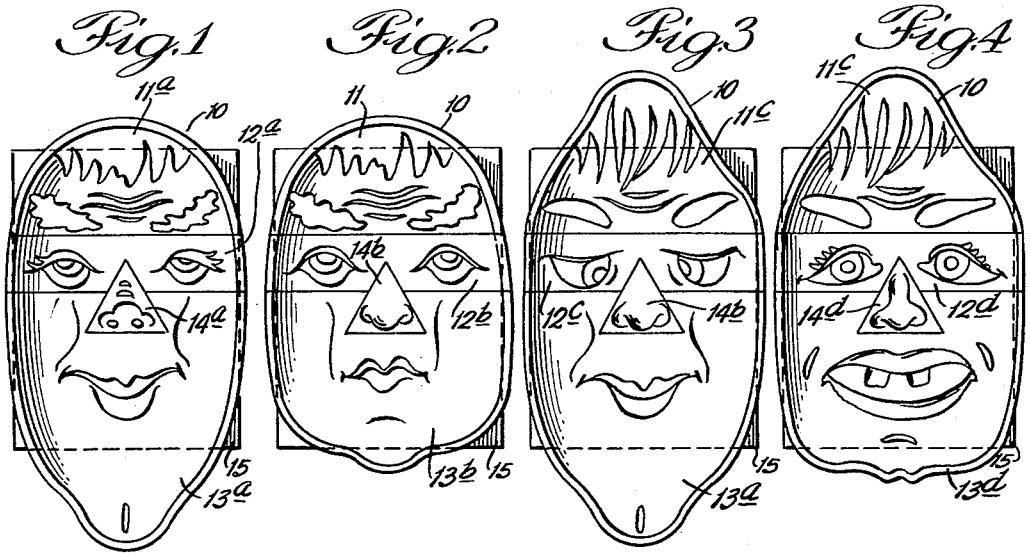
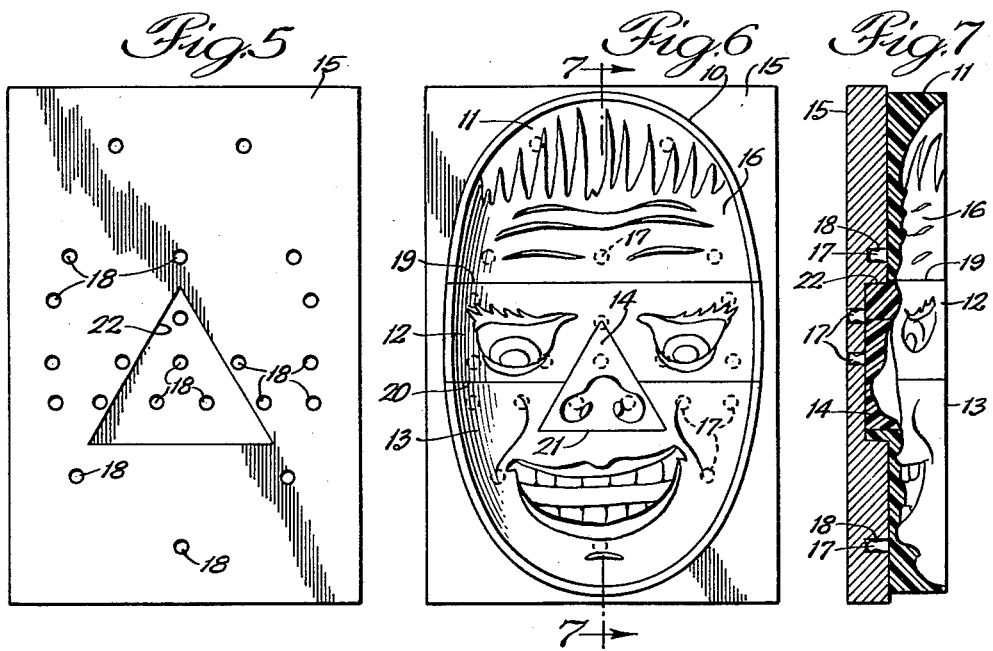
INVENTOR:
Lawrence Weisbach,
BY Dawson, Tilton, Fallon & Lungmus,
ATTORNEYS.

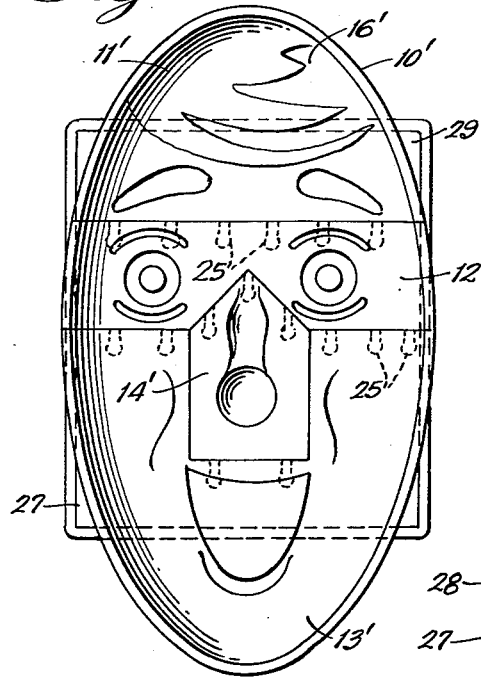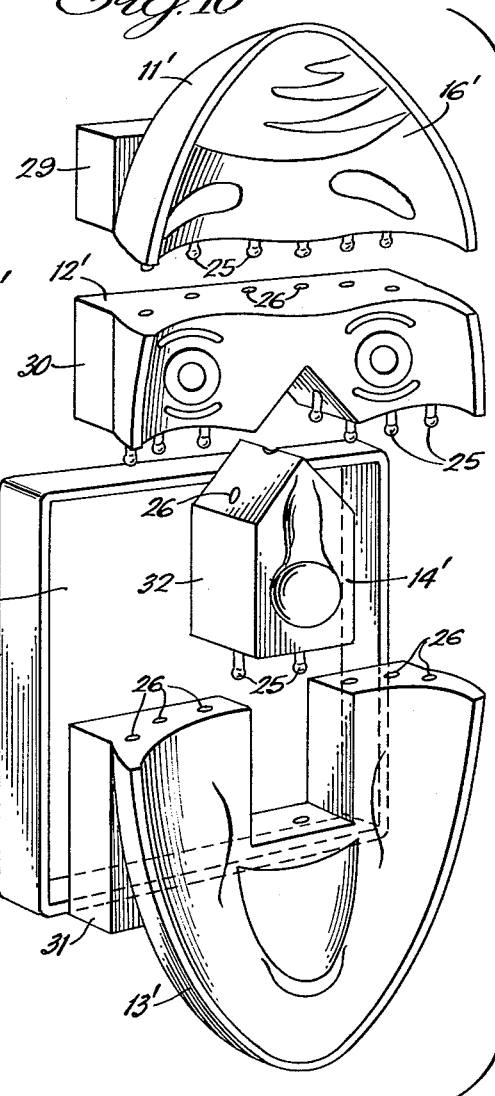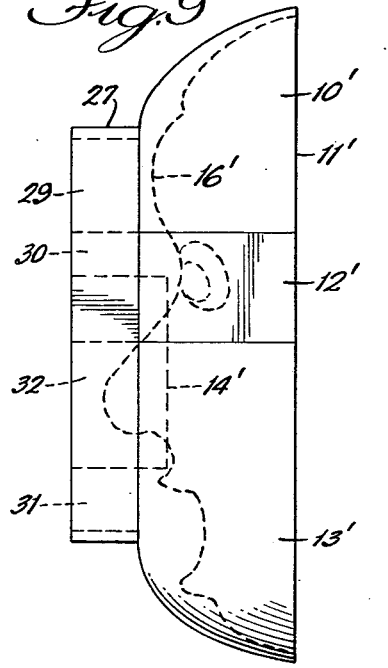

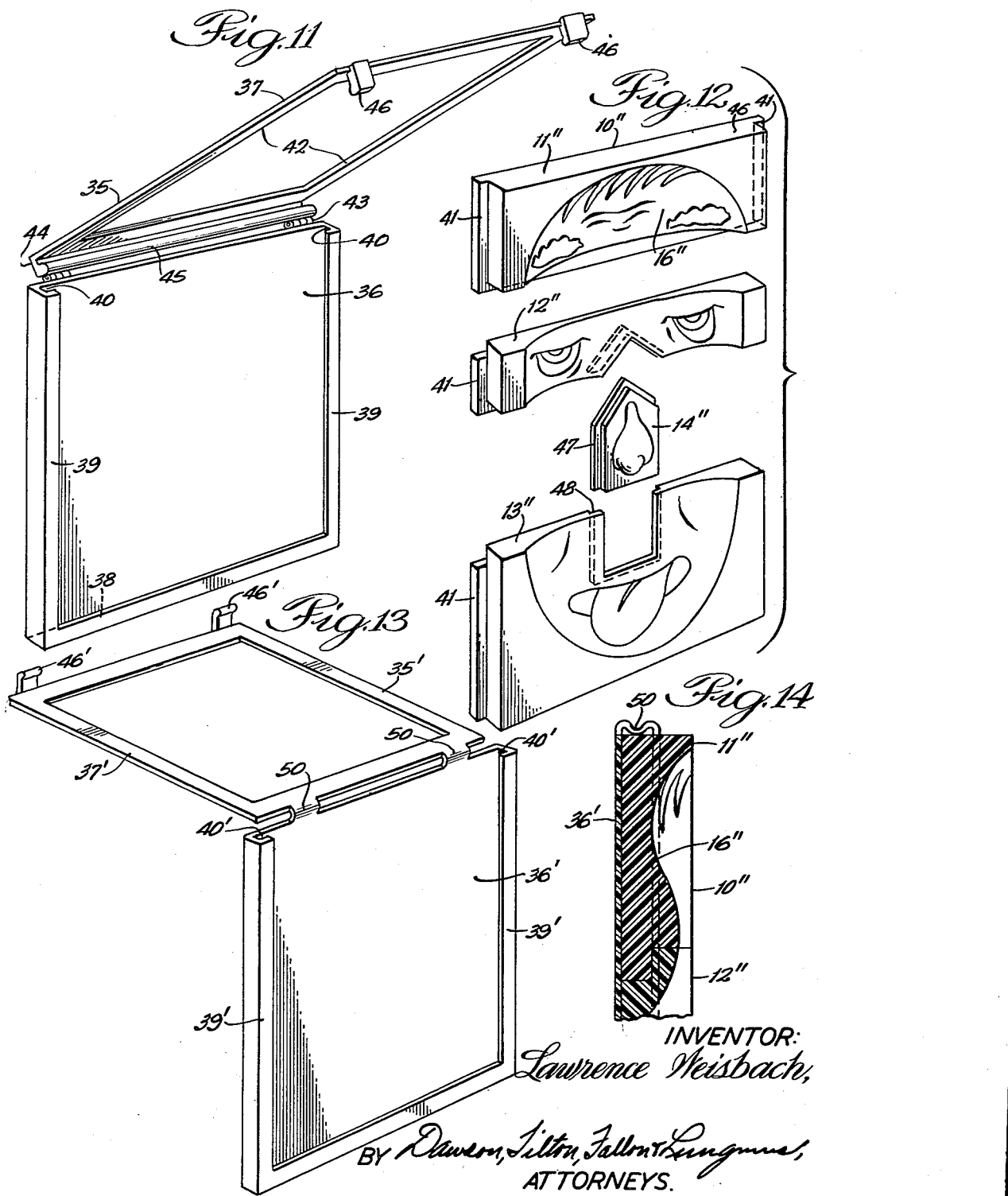

3,061,880
MOLDING TOY
Lawrence Weisbach, 8930 N. Bennett, Skokie, Ill.
Filed Dec. 7, 1959, Ser. No. 857,626
6 Claims. (Cl. 18—34)

This invention relates to a molding toy, and more specifically, to mold particularly suited for use by children as an instructive amusement device for the forming of a variety of molded faces having different features and expressions.

A principal object of the present invention is to provide a structure having parts simple enough to be handled, assembled and used by children so as to form molded three-dimensional faces having any of a variety of different features and expressions. Specifically, it is an object to provide a multiple section mold with interchangeable sections and with means for interlocking or holding a selected number of such sections together to provide a mold cavity defining any of a variety of faces having distinctive characteristics. Another object is to provide means for securely anchoring the mold sections together to form a mold unit capable of withstanding forces which might tend to separate those sections as clay or any other suitable molding material is pushed into the cavity.

Other objects will appear from the specification and drawings in which:

FIGURE 1 is a top plan view of a mold structure embodying the present invention;

FIGURE 2 is a plan view similar to FIG. 1 but showing the mold with different chin and nose sections;

FIGURE 3 is a top plan view of a mold having the chin and mouth section of FIG. 1, the nose section of FIG. 2, and distinctive eye and forehead sections;

FIGURE 4 is a top plan view of a mold having the same forehead section as shown in FIG. 3 but having distinctive eye, nose and chin sections;

FIGURE 5 is a top plan view of a mounting board for supporting the mold sections;

FIGURE 6 is a plan view showing a group of mold sections assembled upon the mounting board;

FIGURE 7 is a longitudinal sectional view taken along lines 7—7 of FIG. 6;

FIGURE 8 is a top plan view of a mold structure constituting a second embodiment of the present invention;

FIGURE 9 is a side elevational view of the structure shown in FIG. 8;

FIGURE 10 is an exploded perspective view illustrating in detail the various parts of the combination comprising the second embodiment;

FIGURE 11 is a perspective view of a mounting frame constituting an element of a third embodiment of the present invention;

FIGURE 12 is an exploded perspective view showing the mold sections adapted for insertion into the frame of FIG. 11;

FIGURE 13 is a perspective view illustrating a modified frame;

FIGURE 14 is an enlarged broken sectional view showing the action of the frame illustrated in FIG. 13 in combination with mold sections of the type shown in FIG. 12.

The structure of the present invention comprises a multiple section mold defining an open mold cavity, the various sections of the mold being replaceable by and interchangeable with other corresponding sections defining different facial characteristics and expressions. Means are provided for interlocking or holding together a group of complementary mold sections so that a child may press molding clay or any other similarly pliable substance into the cavity and thereafter withdraw the clay so as to form a molded face in bas-relief having any of a variety of combined facial characteristics. Thus, in forming a given mold any of a variety of eye sections, nose sections, lower face sections, etc. may be used.

In the embodiment of the invention illustrated in FIGURES 1 through 7, the numeral 10 generally designates a mold formed from a plurality of mold sections 11-14. It will be observed that in FIGURES 1 and 2 the forehead or upper face sections 11a are identical but that the lower face section 13a, eye section 12a and nose section 14a of FIG. 1 differ from the lower face section 13b, eye section 12b and nose section 14b shown in FIG. 2. In FIG. 3, the mold includes the lower face section 13a of FIG. 1 and the nose section 14b of FIG. 2 but has distinctive upper face and eye sections 11c and 12c respectively. Referring to FIG. 4, the mold there shown has the same upper face section 11c illustrated in FIG. 3 but has distinctively different eye, lower face and nose sections 12d through 14d respectively.

FIGURES 1 through 4 illustrate how different mold sections may be assembled to provide mold cavities defining faces having any of a variety of facial characteristics and expressions and, to that extent, are applicable to any of the embodiments which will be specifically described in the following specification. It is to be understood that a kit involving the present invention would include a plurality of corresponding sections each defining a corresponding facial portion having different physical features, the particular varieties shown in FIGURES 1 through 4 being only for purposes of illustration. Thus, a child might select any of a variety of lower face sections to be assembled with any of a variety of nose sections, and so on.

In a typical mold of the type shown in FIGURES 6 and 7 the several mold sections 11-14 are held in place upon a mounting board 15. The mold sections are preferably formed from polyethylene because the smooth, wax like and resilient characteristics of that material facilitate the removal of a molded article from the cavity 16 defined by the multiple sections. Also, the resiliency of the polyethylene gives rise to a highly effective means for connecting the sections to the mounting board, as will be described shortly. However, it is to be understood that other materials having similar properties might also be used to form the multiple section mold.

As shown most clearly in FIG. 7, each of the mold sections is provided with spaced projections 17 extending rearwardly from the otherwise flat rear face thereof. These projections are snugly received within openings 18 (FIG. 5) provided in the front face of the mounting board 15. The slight deformation of the projections upon insertion into the openings results in a firm but separable interconnection between the parts. Since all corresponding mold sections have identically positioned projections 17, a child may, for example, connect any of a group of upper face sections to the board, each of the upper face sections having an identical arrangement of projections and differing only in the shape and size of the cavity portion provided thereby.

To permit interchanging of mold sections, the lines of meeting defined by the mutually contacting edges or surfaces of the different sections of a complete assembly must remain in the same positions with reference to the mounting board. Thus, regardless of the shape of the cavity defined by the upper face section 11, the lower edge of that section must terminate along a line 19 which is precisely oriented with reference to the border and openings 18 of the mounting board 15. Similarly, the upper and lower edges for any given eye section 12 must terminate along lines 19 and 20 respectively. The same is true of the triangular nose section 14 whose side edges must terminate along lines 21. As far as the eye and nose sections 12 and 14 are concerned, it is believed apparent that the peripheral dimensions of these sections must be constant and cannot differ from those of other sections defining similar or corresponding portions of a face.

Furthermore, to permit proper integration of any of a variety of corresponding sections with any of a variety of corresponding adjacent sections, it is necessary that the thickness of the respective sections be identical along the line of meeting. In other words, the thickness and contour of one mold section such as the upper face section 11 must be identical to the thickness and contour of eye section 12 along line 19 so as to provide a flush fit between the respective sections when those sections are mounted upon board 15. In addition, all of the upper face sections of a group of such sections defining foreheads of different shape and size must nevertheless have exactly the same contour and thickness along their lower edges or surfaces. It is believed apparent that the same limitations must also apply to all of the other sections which form other parts of the face if interchangeability of the sections is to be achieved.

To reduce the thickness of the mold sections while at the same time providing adequate relief for the clay face to be molded within the composite cavity defined thereby, I prefer to provide a recess 22 in the face of board 15 adjacent the nose section 12. It will be understood, however, that board 15 may instead be provided with a substantially flat surface (except for openings 18) and that the same degree of depth or relief may be obtained by increasing the wall thickness of the respective mold sections.

In the use of the structure, a child simply selects a complementary set of mold sections from the various groups of similar or corresponding sections and then assembles the selected set upon mounting board 15. For example, if the child wishes to mold a happy face then he selects from the group of lower face sections a section having a smiling or laughing mouth. Such a section might be of the type represented by numeral 13a in FIGURES 1 and 3. Suitable eye, nose and upper face sections are combined with the selected lower face section to form a multiple section mold having a cavity defining a face with the desired expression and facial characteristics. Clay is then pressed into the open cavity and, either before or after hardening, the mass of clay filling the cavity may be removed therefrom to provide a molded face in bas-relief.

The second embodiment of the invention illustrated in FIGURES 8 through 10 is similar to the structure already described except for the manner in which the several mold sections 11', 12', 13' and 14' are held together. As shown most clearly in FIG. 10, adjacent sections of the group are provided with interfitting projections 25 and openings or sockets 26. Thus, the eye section 12' is provided with a series of openings 26 along its top surface which receive the resilient projections 25 of the upper face section 11'. Along its bottom surface, the eye section is provided with projections 25 which fit within openings 26 in the nose and lower face sections 14' and 13' respectively. Like the projections 17 of the first embodiment, projections 25 have enlarged ends and are compressed or deformed slightly upon insertion into openings 26. In attempting to return to their original shape, the projections bear against the walls of openings 26 to lock the sections together. However, by applying sufficient force, a child may easily separate the various sections for the purpose of replacing or interchanging some or all of those sections.

It is to be understood of course that a kit embodying the invention illustrated in FIGURES 8 through 10 would include a number of mold sections corresponding with but having a cavity configuration different than each of the several sections shown in the drawings. A child might therefore select any of several upper face sections 11' to attach to any of a number of eye sections 12', the latter being connected in turn to any of a variety of nose and lower face sections 14' and 13' respectively. The distance between the upper and lower surfaces of the several eye sections 12' would be the same. Similarly, the peripheral dimensions of the group of nose sections 14' would be identical.

During a molding operation in which clay or other suitable molding material is pressed into the cavity 16' defined by the several sections, forces may be exerted upon the sections tending to separate them. To prevent such separation, I provide means in the form of a confining frame or band 27 formed of metal, a rigid plastic, or any other suitable non-stretchable material. The frame is provided with an opening 28 which, in the illustration given, is rectangular in shape and which receives rear portions 29, 30, 31 and 32 of sections 11'–14' respectively. Separation of the mold sections is therefore impossible until the interconnected sections are removed completely from the confining frame 27.

In the embodiment illustrated in FIGURES 11 and 12 a still further means is shown for holding the various sections of a mold 10" together. The various mold sections 11" through 14" are adapted to be received within a frame 35 having a base 36 and a cover 37. The base is rectangular in shape and is provided with a bottom wall 38 and inwardly turned side walls 39 defining spaced parallel channels 40. The mold 10", when fully assembled, is also rectangular in shape. As shown in FIG. 12, the eye section 12" and the upper and lower face sections 11" and 13" respectively are provided with lateral extensions 41 along their flat rear faces and these extensions are adapted to be slidably received within the channels 40 of the frame's base or back element 36.

Cover 37 is provided with a rectangular opening 42 and is connected by hinges 43 to the base 36 adjacent the open upper end thereof. Referring to FIG. 11, it will be observed that the cover is provided with a top wall 44 which closes the open top of the base 36 when the cover is swung downwardly into a superimposing position upon that base. It will also be observed that the top wall 44 of the cover is provided along its inside surface with a bearing member 45 adapted to engage the flat top surface 46 of the upper face section 11" (or the flat bottom surface of the lower face section 13") so as to urge all of the sections downwardly against the bottom wall 38 of the frame and into tight engagement with each other. Resilient fasteners 46 or any other suitable fastening means may be provided for holding the cover in closed position. The fasteners 46 shown in the drawings are adapted to engage the outer surface of the bottom wall 38 so as to frictionally anchor the cover in lowered condition.

If desired, the mutually engaging edges or surfaces of the respective mold sections may be stepped to provide a tongue and groove interconnection between the parts. As shown in FIG. 12, the nose section 14" may be provided with a peripheral flange 47 adapted to be received within a recess 48 in the lower face section 13". In the illustration given, the other mutually engaging edges of the respective sections are similarly offset or stepped to prevent planar disalignment of those sections after insertion into the confining frame 35.

The structure illustrated in FIGURES 11 and 12 is used in much the same manner as the previously described embodiments except for the manner in which the several mold sections are held in place. A child first selects the desired sections from groups of such sections and then assembles them to form a composite mold. The mold is slid into the frame through the open top thereof and, after all of the sections are in place, cover 37 is closed to bring bearing element 45 into contact with the exposed upper surface of the uppermost mold section and thereby urge the sections into tight mutual engagement. After the cover is completely closed and latched in place, the child may then press clay into the open cavity 16" of the mold through the large opening 42 in the cover. Upon removal of the clay from the mold, a molded face in bas-relief is obtained.

Frame 35 may be formed from metal or from any other sturdy and relatively stiff material. It may also be formed in one piece from a resilient and flexible material such as polyethylene or cellulose acetate plastics, as represented by the modification illustrated in FIGURES 13 and 14.

Frame 35' illustrated in FIG. 13 is identical to the frame already described in connection with FIG. 11 except for the hinge and bearing element construction. Cover 37' and base 36' are formed integrally from a single piece of flexible plastic material and are bridged by arcuate hinge straps 50. When the cover is closed, the curved hinge straps extend across the top of the base and their curved lower surfaces bear downwardly against the flat top surface of the uppermost mold section (FIG. 14). Consequently, the hinge straps perform the dual function of connecting the base and cover and also bearing against the mold sections when the cover is closed to urge those sections into tight mutual engagement.

While in the foregoing specification I have disclosed several embodiments of the present invention in considerable detail for purposes of illustration it will be understood by those skilled in the art that many of these details may be varied considerably without departing from the spirit and scope of the invention.

I claim:

1. An amusement device for the molding of faces having different features and expressions comprising a plurality of mold sections capable of being arranged into several complementary groups of corresponding sections, the sections of each of said groups having open cavities defining corresponding portions of physically dissimilar faces, a collection of any of the sections from each of the several groups being arrangeable in juxtaposition to provide a multiple-section mold having a cavity defining an entire face in bas-relief, each section of said multiple-section mold having the face-defining surface thereof flush with the face-defining surfaces of immediately adjacent sections, each of said sections of said collection being interchangeable with corresponding sections of the respective groups to vary the features of the face defined by the open cavity of said multiple-section mold, and means, cooperating with the mold sections of said collection for holding the same together, said means including a plurality of resilient projections provided by each of said mold sections for locking the same against independent relative movement, whereby a pliable material may be packed into said mold cavity without causing separation or relative movement of said sections.

2. The structure of claim 1 in which said means includes a mounting board having a plurality of openings therein, said projections being adapted to be received within said openings for frictionally holding said sections upon said board.

3. The structure of claim 1 in which said means comprises a retaining frame adapted to extend about a collection of said sections for holding the same together, said projections extending between adjacent sections of said mold when the same are assembled.

4. An amusement device comprising a mold having an open cavity along one side thereof defining a face in bas-relief, said mold consisting of a group of separable mold sections each providing a portion of said cavity defining a part of a face, other mold sections corresponding with said first-mentioned sections but defining facial features of different shape and expression, said other sections being interchangeable with said first-mentioned sections to change the combined features of a face defined by the cavity of said mold, the sections of any group defining a complete mold cavity each having its face-defining surface portion flush with the face-defining surface portions of immediately adjacent sections of the group, and means cooperating with said sections for firmly but detachably holding a complete group of the same together, said means including a plurality of resilient projections provided by each of said sections for locking the same against independent relative movement, whereby, a pliable material may be packed into said mold cavity without causing separation or relative movement of said sections.

5. The structure of claim 4 in which said means includes a mounting board supporting said mold, said board being provided with openings for receiving said resilient projections and for holding said sections in selected positions upon said board.

6. The structure of claim 4 in which said means includes a frame defining an opening for receiving at least portions of all of said mold sections of said group when the same are assembled, said projections extending between adjacent sections of said mold when said sections are assembled.

References Cited in the file of this patent

UNITED STATES PATENTS

| | | |
|---|---|---|
| 595,274 | Soper | Dec. 7, 1897 |
| 1,317,093 | Minnick | Sept. 23, 1919 |
| 1,886,486 | Le Ganger | Nov. 8, 1932 |
| 2,006,666 | Bridgett | July 2, 1935 |
| 2,274,060 | Hart | Feb. 24, 1942 |
| 2,315,721 | Martin | Apr. 6, 1943 |
| 2,351,885 | Sommerfeld | June 20, 1944 |
| 2,448,640 | Weston | Sept 7, 1948 |
| 2,451,711 | Beder | Oct. 19, 1948 |
| 2,843,970 | Keuls | July 22, 1958 |
| 2,909,805 | James | Oct. 27, 1959 |

FOREIGN PATENTS

| | | |
|---|---|---|
| 156,617 | Australia | May 20, 1954 |
| 767,643 | France | July 21, 1934 |
| 588,170 | Great Britain | May 15, 1947 |
| 691,131 | Great Britain | May 6, 1953 |